(12) United States Patent
Sarkar et al.

(10) Patent No.: US 11,958,722 B2
(45) Date of Patent: Apr. 16, 2024

(54) VIRTUAL SENSOR FOR ELEVATOR MONITORING

(71) Applicant: OTIS ELEVATOR COMPANY, Farmington, CT (US)

(72) Inventors: Soumalya Sarkar, Manchester, CT (US); Kishore K. Reddy, Vernon, CT (US); Kin Gwn Lore, Manchester, CT (US); George S. Ekladious, Quebec (CA)

(73) Assignee: OTIS ELEVATOR COMPANY, Farmington, CT (US)

( * ) Notice: Subject to any disclaimer, the term of this patent is extended or adjusted under 35 U.S.C. 154(b) by 1153 days.

(21) Appl. No.: 16/720,062

(22) Filed: Dec. 19, 2019

(65) Prior Publication Data

US 2020/0198930 A1 Jun. 25, 2020

Related U.S. Application Data

(60) Provisional application No. 62/783,726, filed on Dec. 21, 2018.

(51) Int. Cl.
*B66B 5/00* (2006.01)
(52) U.S. Cl.
CPC .......... *B66B 5/0025* (2013.01); *B66B 5/0037* (2013.01)
(58) Field of Classification Search
CPC ... B66B 5/0025; B66B 5/0037; B66B 5/0018; B66B 1/06; B66B 1/3423; B66B 1/3446; B66B 5/0031; G05B 23/0221
See application file for complete search history.

(56) References Cited

U.S. PATENT DOCUMENTS

| 7,721,852 B2 | 5/2010 | Ishioka et al. |
| 8,464,841 B2 | 6/2013 | Birrer et al. |

(Continued)

FOREIGN PATENT DOCUMENTS

| CN | 101374357 B | 12/2010 |
| CN | 202988459 U | 6/2013 |

(Continued)

OTHER PUBLICATIONS

Dan, S. "Intelligent elevator control and safety monitoring system", 2018 3rd Asia Conference on Power and Electrical Engineering, IOP Conf. Series: Materials Science and Engineering 366 (2018) 012076, 7 Pages.

(Continued)

*Primary Examiner* — Kurt Philip Liethen
(74) *Attorney, Agent, or Firm* — CANTOR COLBURN LLP

(57) ABSTRACT

A method of monitoring a conveyance apparatus within a conveyance system including: detecting a vibratory signature at a primary location during a commissioning phase using a primary sensing apparatus located at the primary location; detecting a vibratory signature at a secondary location during the commissioning phase using a secondary sensing apparatus located at the secondary location; determining a transfer algorithm in response to the vibratory signature at the primary location during the commissioning phase and the vibratory signature at the secondary location during the commissioning phase; detecting a vibratory signature at the primary location during a normal operation phase using the primary sensing apparatus located at the primary location; and converting the vibratory signature at the primary location during the normal operation phase to a vibratory signature at the secondary location during the normal operation phase using the transfer algorithm.

16 Claims, 4 Drawing Sheets

(56) References Cited

U.S. PATENT DOCUMENTS

| | | | |
|---|---|---|---|
| 8,893,858 | B2 | 11/2014 | Shi et al. |
| 9,033,114 | B2 | 5/2015 | Mizon |
| 9,365,357 | B2 | 6/2016 | Ghezal |
| 9,771,243 | B2 | 9/2017 | Kattainen et al. |
| 10,112,801 | B2 | 10/2018 | Madarasz et al. |
| 2008/0215766 | A1* | 9/2008 | Stobbe .................... G07C 9/27 710/15 |
| 2013/0275059 | A1 | 10/2013 | Bernhard et al. |
| 2015/0259174 | A1 | 9/2015 | Mustonen |
| 2017/0158462 | A1* | 6/2017 | Roberts .................. B66B 9/003 |
| 2018/0306609 | A1 | 10/2018 | Agarwal et al. |
| 2019/0010019 | A1* | 1/2019 | Koushik ............... B66B 5/0037 |
| 2019/0010020 | A1* | 1/2019 | Koushik ............... B66B 5/0037 |
| 2021/0278832 | A1* | 9/2021 | Koumoto ........... G05B 23/0218 |

FOREIGN PATENT DOCUMENTS

| | | |
|---|---|---|
| CN | 103998362 A | 8/2014 |
| CN | 105923483 A | 9/2016 |
| EP | 2489621 A1 | 8/2012 |
| EP | 2653944 A2 | 10/2013 |
| JP | 2013218725 A | 10/2013 |
| WO | 2008013515 A2 | 1/2008 |
| WO | 2018200541 A1 | 11/2018 |

OTHER PUBLICATIONS

Evert, A. "Applications for Sensor Fusion in Vertical Transportation", A Dissertation Presented to The Academic Faculty, In Partial Fulfillment of the Requirements for the Degree Mechanical Engineering in the Woodruff School of Mechanical Engineering, Georgia Institute of Technology, Aug. 2018, 98 Pages.

Gonzalez, M. et al. "Methods and Tools for Model-Based Virtual Sensors Applied to Condition Monitoring", 8th European Workshop on Structural Health Monitoring (EWSHM 2016), Jul. 5-8, 2016, Spain, Bilbao, 10 Pages.

Gonzalez, M. et al. "Model-based virtual sensing approaches for the estimation of forces in guiding systems", Proceedings of ISMA, 2016, 14 Pages.

Huang, Y. et al. "Elevator Safety Monitoring and Early Warning System Based on Directional antenna transmission technology" Electronics, Dec. 2015, vol. 19, No. 2, pp. 101-104.

Suarez, A. et al. "Design of an Elevator Monitoring Application using Internet of Things", International Journal of Applied Engineering Research, vol. 13, No. 6 (2018) pp. 4195-4202.

Uusitalo, J. "Novel Sensor Solutions with Applications of Monitoring of Elevator Systems", Tampere University of Technology, Master of Science Thesis, Feb. 2018, 76 Pages.

Zhang, T. et al. "Elevator-Assisted Sensor Data Collection for Structural Health Monitoring", IEEE Transactions on Mobile Computing, Oct. 2012, vol. 11, No. 10, pp. 1555-1568.

First Chinese Office Action for Application No. 201911323724.9; Office Action dated Nov. 15, 2021; Office Action Received: Nov. 18, 2021; 8 pages.

The Extended European Search Report for Application No. 1921250. 0-1017/3670415; Report dated Jun. 2, 2020; Report Received Date: Jun. 17, 2020; 9 pages.

* cited by examiner

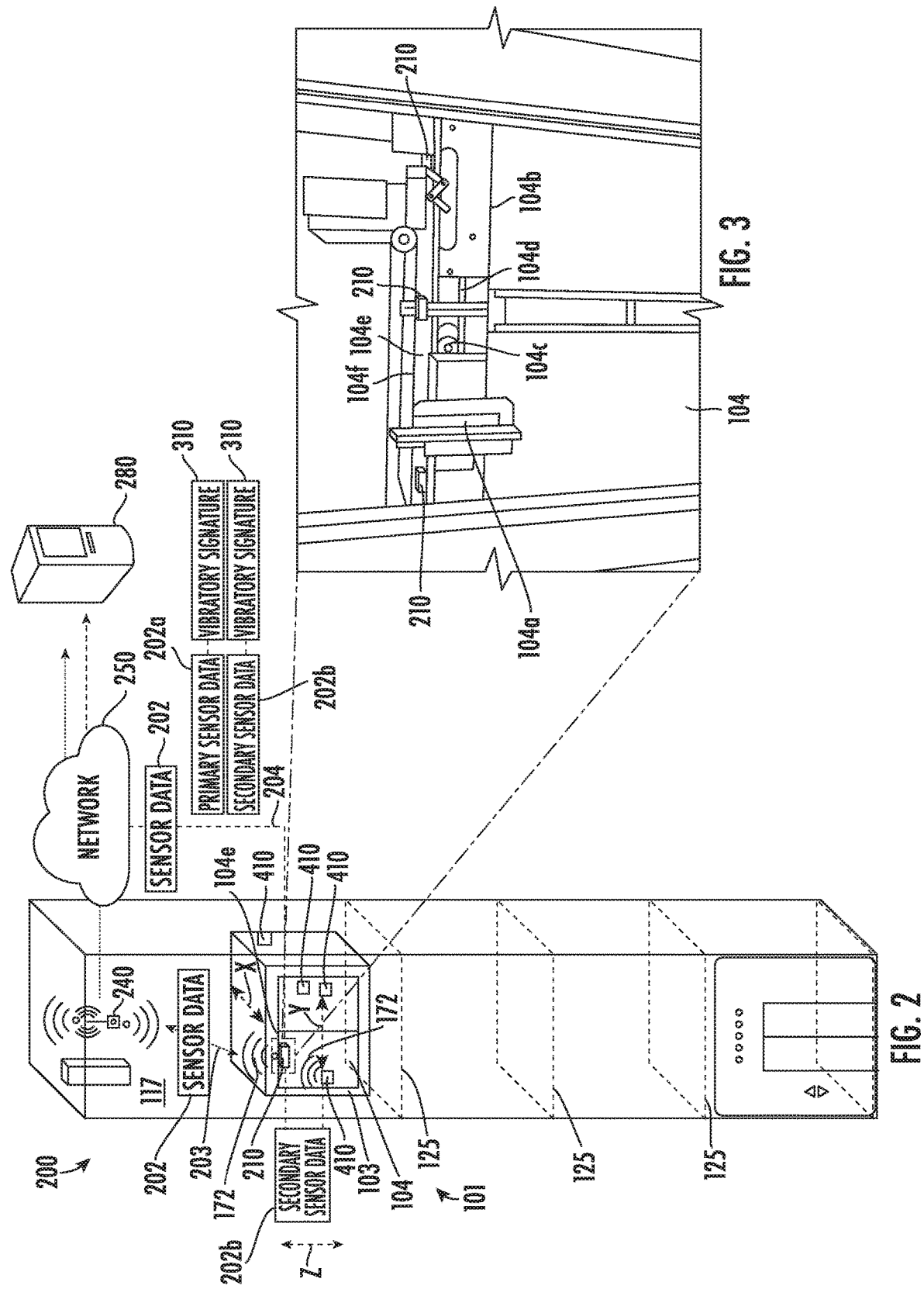

VIRTUAL SENSOR FOR ELEVATOR MONITORING

CROSS-REFERENCE TO RELATED APPLICATIONS

This application claims the benefit of U.S. Provisional Application No. 62/783,726 filed Dec. 21, 2018, which is incorporated herein by reference in its entirety.

BACKGROUND

The embodiments herein relate to the field of conveyance systems, and specifically to a method and apparatus for monitoring a conveyance system.

Conveyance systems, such as, for example, elevator systems, escalator systems, and moving walkways may require periodic monitoring to perform diagnostics.

BRIEF SUMMARY

According to an embodiment, a method of monitoring a conveyance apparatus within a conveyance system is provided. The method including: detecting a vibratory signature at a primary location during a commissioning phase using a primary sensing apparatus located at the primary location; detecting a vibratory signature at a secondary location during the commissioning phase using a secondary sensing apparatus located at the secondary location; determining a transfer algorithm in response to the vibratory signature at the primary location during the commissioning phase and the vibratory signature at the secondary location during the commissioning phase; detecting a vibratory signature at the primary location during a normal operation phase using the primary sensing apparatus located at the primary location; and converting the vibratory signature at the primary location during the normal operation phase to a vibratory signature at the secondary location during the normal operation phase using the transfer algorithm.

In addition to one or more of the features described herein, or as an alternative, further embodiments may include that prior to the detecting the vibratory signature at the primary location during the commissioning phase using the primary sensing apparatus located at the primary location, the method further includes: moving the conveyance apparatus for the commissioning phase.

In addition to one or more of the features described herein, or as an alternative, further embodiments may include that prior to the detecting the vibratory signature at the primary location during the normal operation phase using the primary sensing apparatus located at the primary location, the method further includes: moving the conveyance apparatus for the normal operation phase.

In addition to one or more of the features described herein, or as an alternative, further embodiments may include that the conveyance system is an elevator system and the conveyance apparatus is an elevator car.

In addition to one or more of the features described herein, or as an alternative, further embodiments may include: determining an abnormality in response to the vibratory signature at the secondary location during the normal operation phase without the presence of the secondary sensor.

In addition to one or more of the features described herein, or as an alternative, further embodiments may include that the primary location is located on the conveyance apparatus.

In addition to one or more of the features described herein, or as an alternative, further embodiments may include that the secondary location is located on the conveyance apparatus.

In addition to one or more of the features described herein, or as an alternative, further embodiments may include that the secondary location is located on the conveyance apparatus.

In addition to one or more of the features described herein, or as an alternative, further embodiments may include that the secondary sensing apparatus is removed from the conveyance system prior to the detecting a vibratory signature at the primary location during a normal operation phase using the primary sensing apparatus located at the primary location; and converting the vibratory signature at the primary location during the normal operation phase to a vibratory signature at the secondary location during the normal operation phase using the transfer algorithm.

In addition to one or more of the features described herein, or as an alternative, further embodiments may include: tracking component degradation level in response to the vibratory signature at the secondary location during the normal operation phase without the secondary sensing apparatus.

According to another embodiment, a sensor system for monitoring a conveyance apparatus of a conveyance system is provided. The sensor system including: a primary sensing apparatus located at a primary location, the primary sensing apparatus configured to detect a vibratory signature at the primary location during a commissioning phase and a vibratory signature at the primary location during a normal operation phase; a secondary sensing apparatus located at a secondary location, the secondary sensing apparatus configured to detect a vibratory signature at the secondary location during the commissioning phase; and a data conversion module configured to perform operations including: receiving the vibratory signature at the primary location during the commissioning phase from the primary sensing apparatus; receiving the vibratory signature at the secondary location during the commissioning phase from the secondary sensing apparatus; determining a transfer algorithm in response to the vibratory signature at the primary location during the commissioning phase and the vibratory signature at the secondary location during the commissioning phase; receiving the vibratory signature at the primary location during the normal operation phase from the primary sensing apparatus; and converting the vibratory signature at the primary location during the normal operation phase to a vibratory signature at the secondary location during the normal operation phase using the transfer algorithm.

In addition to one or more of the features described herein, or as an alternative, further embodiments may include that the conveyance system is an elevator system and the conveyance apparatus is an elevator car.

In addition to one or more of the features described herein, or as an alternative, further embodiments may include that the operations further include: determining an abnormality in response to the vibratory signature at the secondary location during the normal operation phase.

In addition to one or more of the features described herein, or as an alternative, further embodiments may include that the primary location is located on the conveyance apparatus.

In addition to one or more of the features described herein, or as an alternative, further embodiments may include that the secondary location is located on the conveyance apparatus.

In addition to one or more of the features described herein, or as an alternative, further embodiments may include that the secondary location is located on the conveyance apparatus.

In addition to one or more of the features described herein, or as an alternative, further embodiments may include that the secondary sensing apparatus is removed from the conveyance system prior to the detecting a vibratory signature at the primary location during a normal operation phase using the primary sensing apparatus located at the primary location; and converting the vibratory signature at the primary location during the normal operation phase to a vibratory signature at the secondary location during the normal operation phase using the transfer algorithm.

In addition to one or more of the features described herein, or as an alternative, further embodiments may include that operations further include: tracking component degradation level in response to the vibratory signature at the secondary location during the normal operation phase without the secondary sensing apparatus.

According to another embodiment, a computer program product tangibly embodied on a computer readable medium is provided. The computer program product including instructions that, when executed by a processor, cause the processor to perform operations including: detecting a vibratory signature at a primary location during a commissioning phase using a primary sensing apparatus located at the primary location; detecting a vibratory signature at a secondary location during the commissioning phase using a secondary sensing apparatus located at the secondary location; determining a transfer algorithm in response to the vibratory signature at the primary location during the commissioning phase and the vibratory signature at the secondary location during the commissioning phase; detecting a vibratory signature at the primary location during a normal operation phase using the primary sensing apparatus located at the primary location; and converting the vibratory signature at the primary location during the normal operation phase to a vibratory signature at the secondary location during the normal operation phase using the transfer algorithm.

In addition to one or more of the features described herein, or as an alternative, further embodiments may include that prior to the detecting the vibratory signature at the primary location during the commissioning phase using the primary sensing apparatus located at the primary location, the operations further includes: moving the conveyance apparatus for the commissioning phase.

Technical effects of embodiments of the present disclosure include using determining a transfer algorithm between vibratory signatures in a primary location and a secondary location and then using the transfer algorithm to determine vibratory signature at the secondary location using vibratory signature at the primary location.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIG. 2 is a schematic illustration of a sensor system for the elevator system of FIG. 1, in accordance with an embodiment of the disclosure;

FIG. 3 is a schematic illustration of the location of primary sensing apparatus of the sensor system of FIG. 2, in accordance with an embodiment of the disclosure;

DETAILED DESCRIPTION

Figure 1:
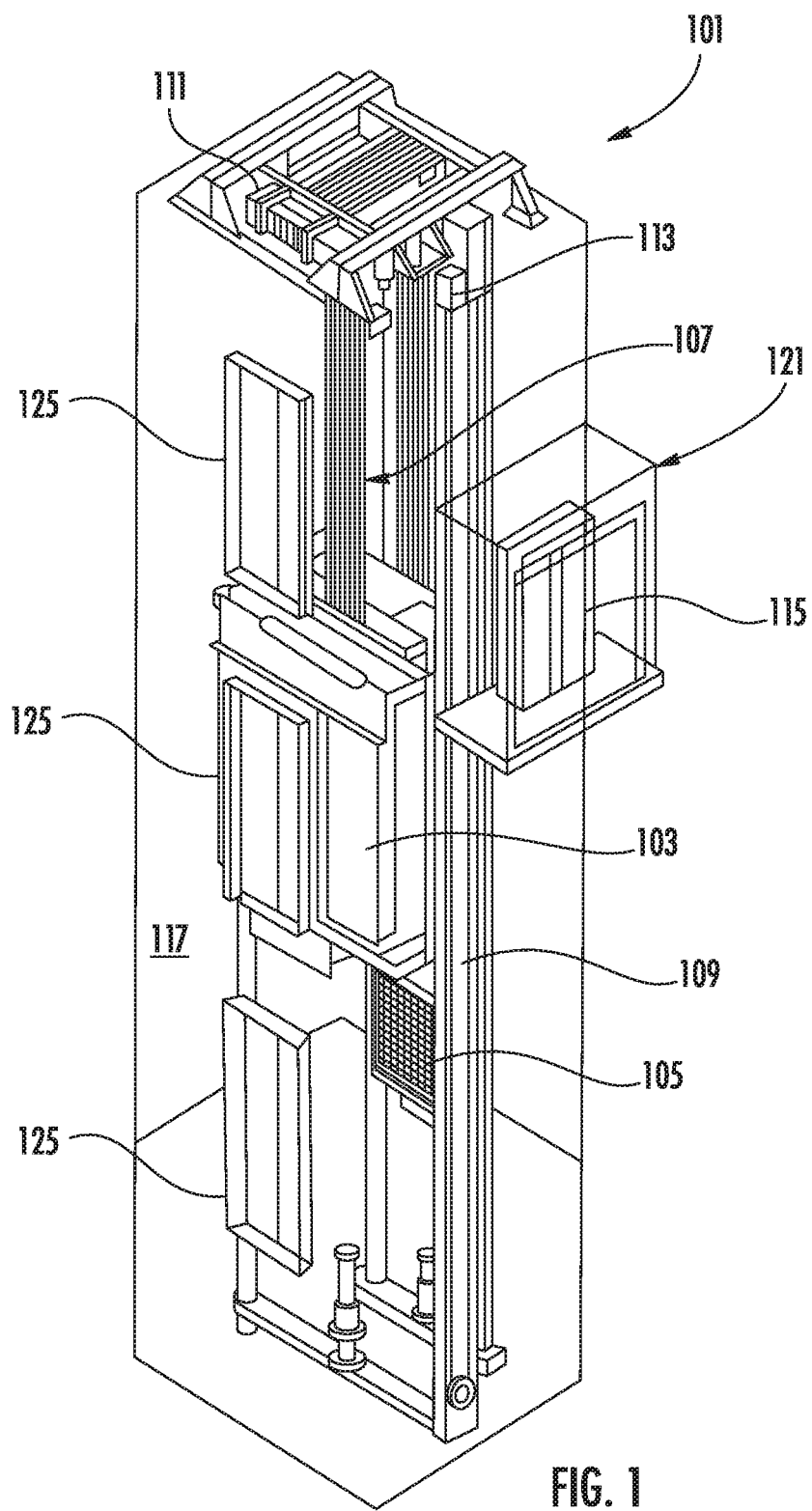
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115.

Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

FIG. 2 is a view of a sensor system 200 including a primary sensing apparatus 210 located at a primary location and one or more secondary sensing apparatus 410 each located at secondary locations, according to an embodiment of the present disclosure. The primary sensing apparatus 210 is configured to determine sensor data 202 and transmit the sensor data 202 to a monitoring system 280. The sensor data 202 includes primary sensor data 202a and secondary sensor data 202b. The primary sensing apparatus 210 is configured to detect primary sensor data 202a of the elevator car 103 and determine secondary sensor data 202b, discussed further below. Primary sensor data 202a and secondary sensing data 202b may include but is not limited to vibratory signatures 310 (i.e., vibrations over a period of time) or accelerations and derivatives or integrals of accelerations of the elevator car 103, such as, for example, distance, velocity, jerk, jounce, snap . . . etc. The primary sensing data 202a may also include light, pressure, sound, humidity, and temperature, or any other desired data parameter. In an embodiment, the primary sensing apparatus 210 is configured to transmit sensor data 202 that is raw and unprocessed to the monitoring system 280 for processing. In an embodiment, the primary sensing apparatus 210 is configured to process the sensor data 202 prior to transmitting the sensor data 202 to the monitoring system 280. The processing of the sensor data 202 may reveal data, such as, for example, a number of elevator door openings/closings, elevator door time, vibrations, vibratory signatures, a number of elevator rides, elevator ride performance, elevator flight time, relative and absolute car position (e.g. elevation, floor number), releveling events, rollbacks, elevator car 103 x, y acceleration at a position: (i.e., rail topology), elevator car 103 x, y vibratory signatures at a position: (i.e., rail topology), door performance at a landing number, nudging event, vandalism events, emergency stops, etc. Although illustrated as separate devices, the monitoring system 280 and the primary sensing apparatus 210 may be a single device in a non-limiting embodiment. The monitoring system 280 may be a computing device, such as, for example, a desktop or cloud computer. The monitoring system 280 may also be a mobile computing device that is typically carried by a person, such as, for example a smartphone, PDA, smartwatch, tablet, laptop, etc. The monitoring system 280 may also be two separate devices that are synced together, such as, for example, a cellular phone and a desktop computer synced over an internet connection. The monitoring system 280 may also be a cloud computing network.

The monitoring system 280 may be local relative to the primary sensing apparatus 210 or remote relative to the primary sensing apparatus 210. The primary sensing apparatus 210 is configured to transmit the sensor data 202 to the monitoring system 280 via short-range wireless protocols 203 and/or long-range wireless protocols 204. Short-range wireless protocols 203 may include but are not limited to Bluetooth, Wi-Fi, HaLow (801.11ah), zWave, Zigbee, or Wireless M-Bus. In one embodiment, using short-range wireless protocols 203, the primary sensing apparatus 210 is configured to transmit the sensor data 202 to a local gateway device 240 and the local gateway device 240 is configured to transmit the sensor data 202 to a monitoring system 280 through a network 250. The network 250 may be a computing network, such as, for example, a cloud computing network, cellular network, or any other computing network known to one of skill in the art. Using long-range wireless protocols 204, the primary sensing apparatus 210 is configured to transmit the sensor data 202 to a monitoring system 280 through a network 250. Long-range wireless protocols 204 may include but are not limited to cellular, satellite, LTE (NB-IoT, CAT M1), LoRa, Satellite, Ingenu, or SigFox.

FIG. 2 also shows a possible primary locations (i.e., installation locations) of the primary sensing apparatus 210 within the elevator system 101. The primary sensing apparatus 210 may be hard and/or wirelessly connect to the controller 115 of the elevator system 101. In an embodiment, the primary sensing apparatus 210 may be attached to a door header 104e of a door 104 of the elevator car 103. Advantageously, by attaching the primary sensing apparatus 210 to the door header 104e of the elevator car 103 the primary sensing apparatus 210 may detect accelerations of the elevator car 103 and while being relatively isolated from vibrations from the doors 104 of the elevator car 103 when the doors 104 are not opening or closing. For example, when located on the door 104, the primary sensing apparatus 210 may detect when the elevator car 103 is in motion, when the elevator car 103 is slowing, when the elevator car 103 is stopping, and when the doors 104 open to allow passengers to exit and enter the elevator car 103 because when the doors 104 open and close the vibrations will be transferred to the header 104e. It is understood that the primary sensing apparatus 210 may also be installed in other locations other than the header 104e of the elevator system 101. In another embodiment, the primary sensing apparatus 210 is installed on a door 104 structure of the elevator car 103. In another embodiment, the primary sensing apparatus 210 is installed elsewhere on the elevator car 103. In one embodiment, separate door state sensors may be used. These door state sensors may be mounted on the landing door or car door. In one embodiment, the door state sensor may be an accelerometer, magnetic switch, read switch, proximity sensors, trigger switch, or any other desired known sensing device.

The primary sensing apparatus 210 may be configured to detect primary sensor data 202a including acceleration in any number of directions. In an embodiment, the primary sensing apparatus 210 may detect primary sensor data 202a including accelerations along any number or combination of three axis, an X axis, a Y axis, and a Z axis, as show in in FIG. 2. The X axis may be perpendicular to the doors 104 of the elevator car 103, as shown in FIG. 2. The Y axis may be parallel to the doors 104 of the elevator car 103, as shown in FIG. 2. The Z axis may be aligned vertically parallel with the elevator shaft 117 and pull of gravity, as shown in FIG. 2. Vibratory signatures may be generated along the X-axis and the Y-axis as the elevator car 103 moves along the Z-axis.

The primary sensing apparatus 210 may be installed on the elevator system 101 during a commissioning phase and normal operation of the elevator system 101 in a primary location that is known, whereas the one or more secondary sensing apparatus 410 may only be installed on the elevator system 101 during the commissioning phase of the elevator system 101 in one or more secondary locations that are known. The secondary sensing apparatus 410 are low cost physical sensors in comparison to the primary sensing apparatus. The Secondary sensing apparatus 410 may sense different modalities of data as well (e.g., not just three-axis accelerometer signals but also light, sound, etc.). In embodiment, the second sensing apparatus 410 may be a three-axis accelerometer configured. In an embodiment, the secondary sensing apparatus 210 may detect secondary sensor data 202b include vibratory signatures 310 along one or more axis. The one or more axis may include three axis, such as, for example, the X axis, the Y axis, and the Z axis, as show in in FIG. 2. The secondary sensing apparatus 410 may then transmit the secondary sensor data 202b to the primary sensing apparatus 210. The primary sensing apparatus 210 may translate the secondary sensor data 202b into the primary sensor data 202a or the primary sensing apparatus 210 may transmit the secondary sensor data 202b to the monitoring system 280 and then the monitoring system 280 may translate the secondary sensor data 202b into the primary sensor data 202a. The secondary sensing apparatus 410 may utilize short range wireless signals 172 to communicate with the primary sensing apparatus 410 including but not limited to a magnetic field, RFID, Bluetooth, Wi-Fi, HaLow (801.11ah), zWave, Zigbee, or Wireless M-Bus.

FIG. 3 is an enlarged view of multiple possible primary locations of the primary sensing apparatus 210 along the door header 104e. As shown in FIG. 3, the primary sensing apparatus 201 may be located on a door header 104e proximate a top portion 104f of the elevator car 103. The doors 104 are operably connected to the door header 104e through a door hanger 104a located proximate a top portion 104b of the door 104. The door hanger 104a includes guide wheels 104c that allow the door 104 to slide open and close along a guide rail 104d on the door header 104e.

Advantageously, the door header 104e is an easy to access area to attach the primary sensing apparatus 210 because the door header 104e is accessible when the elevator car 103 is at landing 125 and the elevator door 104 is open. Thus, installation of the primary sensing apparatus 210 is possible without taking special measures to take control over the elevator car 103. For example, the additional safety of an emergency door stop to hold the elevator door 104 open is not necessary as door 104 opening at landing 125 is a normal operation mode. The door header 104e also provides ample clearance for the primary sensing apparatus 210 during operation of the elevator car 103, such as, for example, door 104 opening and closing.

If the primary location of the primary sensing apparatus 210 is on the door header 104e, primary sensing apparatus 210 may be able to detect door 104 open and close motions (i.e., acceleration) but not as clearly as a primary sensing apparatus 210 located on the door 104. However, advantageously, mounting the primary sensing apparatus 210 on the header 104e allows for clearer recording of a ride quality of the elevator car 103, which is equally important and would not be possible if the primary sensing apparatus 210 was mounted on the door 104 due to additional vibration of the door 104 during the elevator car 103 motion. Thus, by mounting the primary sensing apparatus 210 on the header 104e the primary sensing apparatus 210 is able to get clearer acceleration detections along the X axis, the Y axis, and the Z axis from which vibratory signatures could be compiles in the X axis along the Z axis and the Y axis along the Z axis. It is understood that while two primary sensing apparatuses 210 are illustrated in FIG. 3, only one primary sensing apparatus 210 is required and two are illustrated to show two possible primary locations for the primary sensing apparatus 210.

Figure 4:
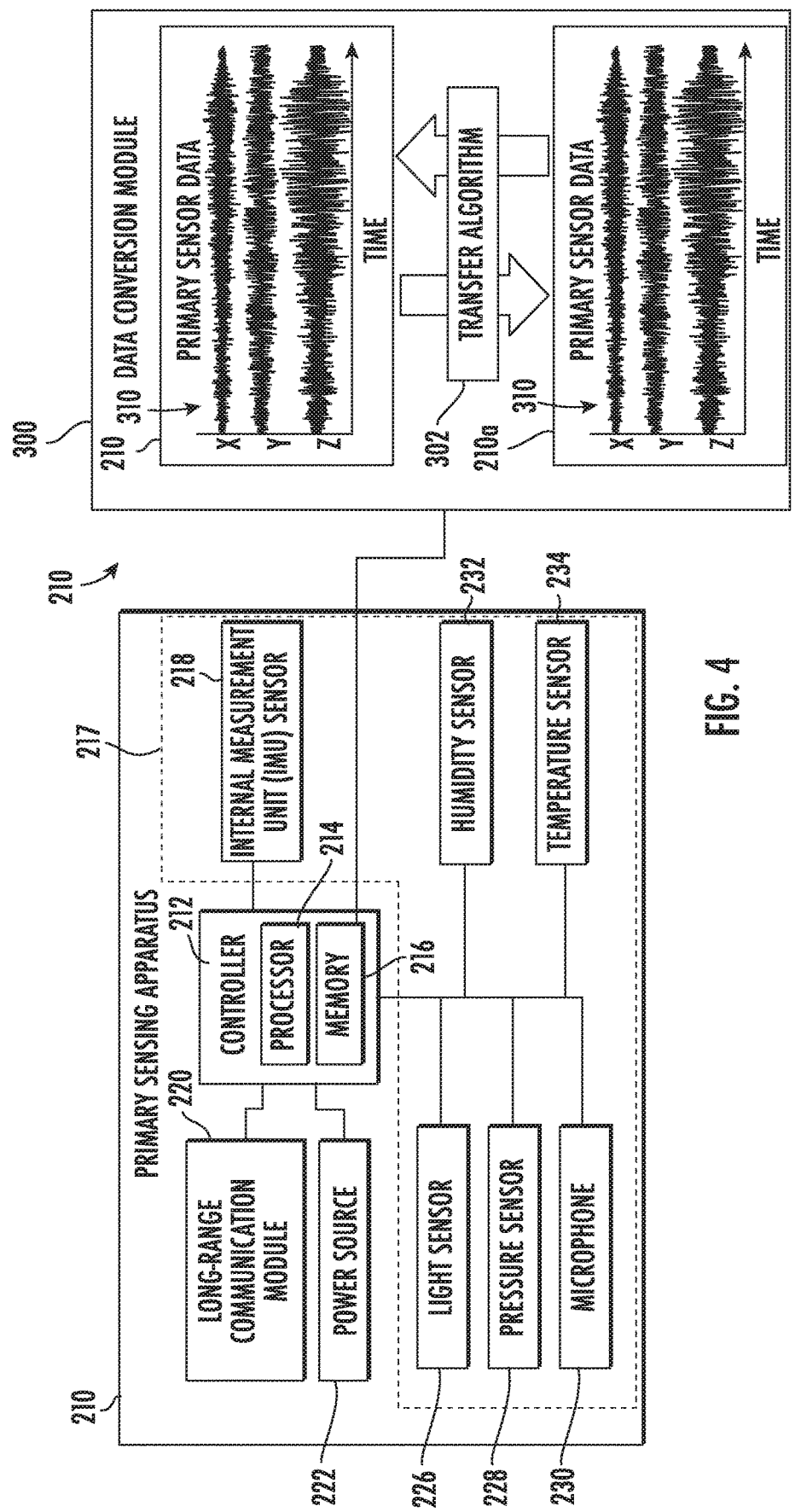
FIG. 4 is a schematic illustration of a primary sensing apparatus of the sensor system of FIG. 2, in accordance with an embodiment of the disclosure.

FIG. 4 illustrates a block diagram of the primary sensing apparatus 210 of the sensing system of FIG. 2. It should be appreciated that, although particular systems are separately defined in the schematic block diagram of FIG. 4, each or any of the systems may be otherwise combined or separated via hardware and/or software. As shown in FIG. 4, the primary sensing apparatus 210 may include a controller 212, a plurality of sensors 217 in communication with the controller 212, a communication module 220 in communication with the controller 212, and a power source 222 electrically connected to the controller 212.

The plurality of sensors 217 may include an inertial measurement unit (IMU) sensor 218 configured to detect primary sensor data 202a of the primary sensing apparatus 210 and the elevator car 103 when the primary sensing apparatus 210 is attached to the elevator car 103. The IMU sensor 218 may be a sensor, such as, for example, an accelerometer, a gyroscope, or a similar sensor known to one of skill in the art. The primary sensor data 202a detected by the IMU sensor 218 may include vibratory signatures (i.e., accelerations) as well as derivatives or integrals of accelerations, such as, for example, velocity, jerk, jounce, snap . . . etc. The IMU sensor 218 is in communication with the controller 212 of the primary sensing apparatus 210.

The plurality of sensors 217 may also include additional sensors including but not limited to a light sensor 226, a pressure sensor 228, a microphone 230, a humidity sensor 232, and a temperature sensor 234. The light sensor 226 is configured to detect primary sensor data 202a including light exposure. The light sensor 226 is in communication with the controller 212. The pressure sensor 228 is configured to detect primary sensor data 202a including pressure levels. The pressure sensor 228 is in communication with the controller 212. The microphone 230 is configured to detect primary sensor data 202a including audible sound and sound levels. The microphone 230 is in communication with the controller 212. The humidity sensor 232 is configured to detect primary sensor data 202a including humidity levels. The humidity sensor 232 is in communication with the controller 212. The temperature sensor 234 is configured to detect primary sensor data 202a including temperature levels. The temperature sensor 234 is in communication with the controller 212.

The controller 212 of the primary sensing apparatus 210 includes a processor 214 and an associated memory 216 comprising computer-executable instructions that, when executed by the processor 214, cause the processor 214 to perform various operations, such as, for example, processing the primary sensor data 202a collected by the IMU sensor 218, the light sensor 226, the pressure sensor 228, the microphone 230, the humidity sensor 232, and the temperature sensor 234. The processor 214 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 216 may be a storage device, such as, for example, a random access memory (RAM), read only memory (ROM), or other electronic, optical, magnetic or any other computer readable medium.

The power source 222 of the primary sensing apparatus 210 is configured to store and supply electrical power to the primary sensing apparatus 210. The power source 222 may include an energy storage system, such as, for example, a battery system, capacitor, or other energy storage system known to one of skill in the art. The power source 222 may also generate electrical power for the primary sensing apparatus 210. The power source 222 may also include an energy generation or electricity harvesting system, such as, for example synchronous generator, induction generator, or other type of electrical generator known to one of skill in the art.

The primary sensing apparatus 210 includes a communication module 220 configured to allow the controller 212 of the primary sensing apparatus 210 to communicate with the monitoring system 280 through at least one of short-range wireless protocols 203 and long-range wireless protocols 204. The communication module 220 may be configured to communicate with the monitoring system 280 using short-range wireless protocols 203, such as, for example, Bluetooth, Wi-Fi, HaLow (801.11ah), Wireless M-Bus, zWave, Zigbee, or other short-range wireless protocol known to one of skill in the art. Using short-range wireless protocols 203, the communication module 220 is configured to transmit the sensor data 202 to a local gateway device 240 and the local gateway device 240 is configured to transmit the sensor data to a monitoring system 280 through a network 250, as described above. The communication module 220 may be configured to communicate with the monitoring system 280 using long-range wireless protocols 204, such as for example, cellular, LTE (NB-IoT, CAT M1), LoRa, Ingenu, SigFox, Satellite, or other long-range wireless protocol known to one of skill in the art. Using long-range wireless protocols 204, the communication module 220 is configured to transmit the sensor data 202 to a monitoring system 280 through a network 250. In an embodiment, the short-range wireless protocol 203 is sub GHz Wireless M-Bus. In another embodiment, the long-range wireless protocol is Sigfox. In another embodiment, the long-range wireless protocol is LTE NB-IoT or CAT M1 with 2G fallback.

The primary sensing apparatus 210 also includes a data conversion module 300 stored within the memory of the primary sensing apparatus 210. The data conversion module 300 is configured to determine a transfer algorithm 302 in response to the secondary sensor data 202b and the primary sensor data 202a. The transfer algorithm 302 may be stored within the memory 216 of the controller 212. Multiple commissioning runs by the elevator car 103 up and down the elevator shaft 117 may be performed to further refine the transfer algorithm 302 during a commissioning phase. The transfer algorithm 302 converts secondary sensor data 202b into primary sensor data 202a and may also convert primary sensor data 202a into secondary sensor data 202b. Thus, once the commissioning phase is completed and the secondary sensing apparatus 410 removed from the elevator system 101, vibratory signatures 310 of the primary sensor data 202a detected by the primary sensing apparatus 210 during a normal operation operating phase may be converted to vibratory signatures 310 of the secondary sensor data 202b at each secondary location where a secondary sensing apparatus 410 previously existed. The vibratory signatures 310 may be the acceleration detected along one or more of the X axis, the Y axis, and the Z axis over a period of time or distance. The axis may include three axis such as the X axis, a Y axis, and a Z axis, as shown in FIG. 2. In one example, vibratory signatures 310 within the primary sensor data 210 at the primary location may be converted to vibratory signature 310 of the secondary sensor data 210a at the secondary location. Advantageously, the data conversion module 300 and associated transfer algorithm 302 allows the primary sensing apparatus 210 to determine vibratory signatures 310 at each of the secondary location during normal operation when the secondary sensing apparatus 410 are no longer attached to the elevator system 101.

Advantageously, the transfer algorithm 302 eliminates the need to have the secondary sensing apparatus 410 installed permanently on the elevator system 101. Advantageously, not all elevator systems have to ability to install the secondary sensing apparatus 410, thus the transfer algorithm 302 from one elevator system may be applied to other elevator systems, which provides richer data for predictive machine learning.

Figure 5:
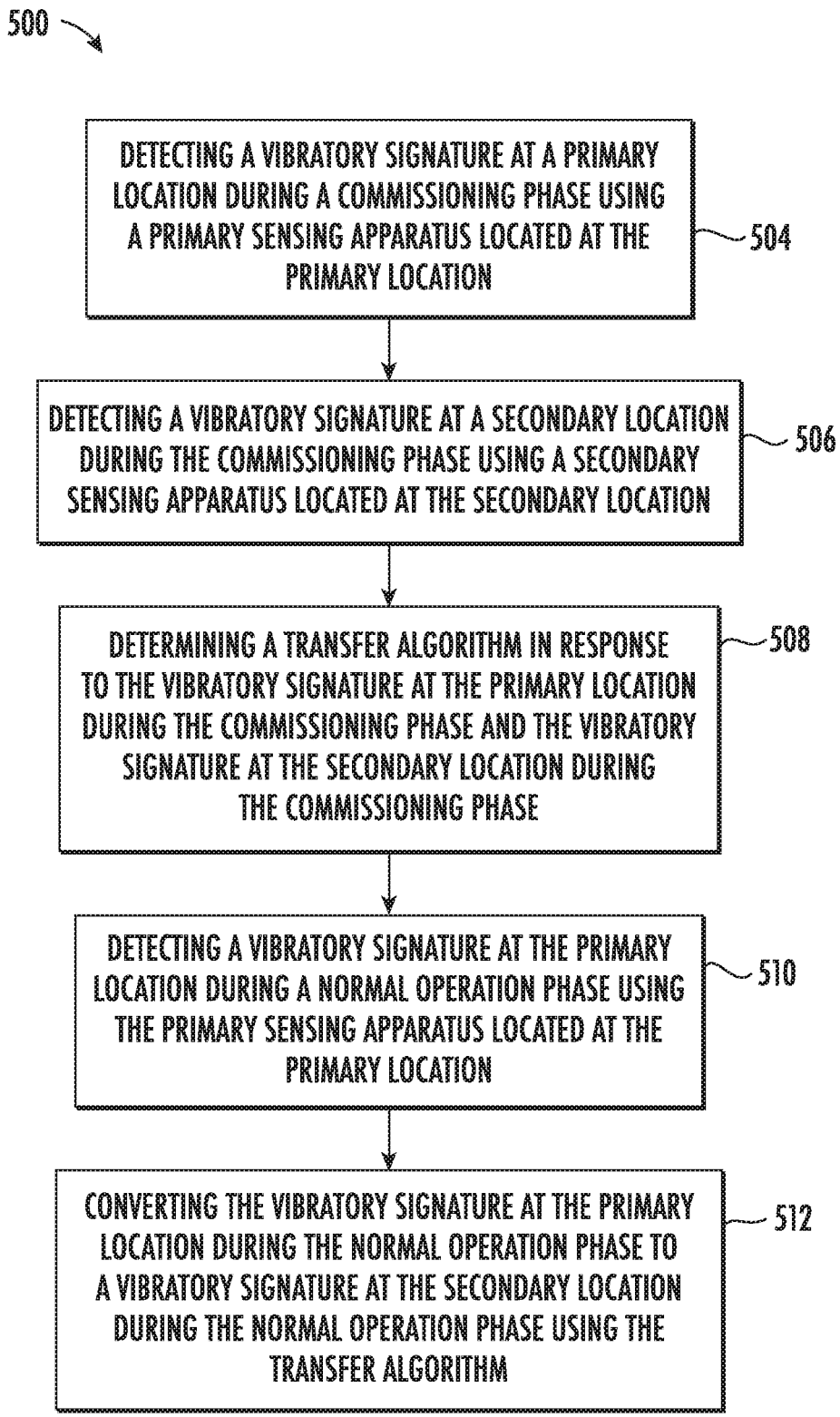
FIG. 5 is a flow chart of a method of monitoring a conveyance apparatus within a conveyance system, in accordance with an embodiment of the disclosure.

Referring now to FIG. 5, while referencing components of FIGS. 1-4. FIG. 5 shows a flow chart of a method 500 of monitoring a conveyance apparatus within a conveyance system, in accordance with an embodiment of the disclosure. In an embodiment, the conveyance system is an elevator system 101 and the conveyance apparatus is an elevator car 103. In an embodiment, the method 500 is performed by the data conversion module 300, which may be located on the controller 212 of primary sensing apparatus 210. Although not shown in FIG. 5, the method 500 may initiate with moving the conveyance apparatus for a commissioning phase. At block 504, a vibratory signature 310 is detected at a primary location during a commissioning phase using a primary sensing apparatus 210 located at the primary location. In an embodiment, the primary location is located on the conveyance apparatus. At block 506, a vibratory signature 310 is detected at a secondary location during the commissioning phase using a secondary sensing apparatus 400 located at the secondary location. In an embodiment, the secondary location is located on the conveyance apparatus.

At block 508, a transfer algorithm 302 is determined in response to the vibratory signature 310 at the primary location during the commissioning phase and the vibratory signature 310 at the secondary location during the commissioning phase. Although not shown in FIG. 5, the method 500 may include between block 508 and 510 moving the conveyance apparatus for a normal operation phase, during which the secondary sensing apparatus 410 have been removed from the conveyance system. At block 510, a vibratory signature 310 is detected at the primary location during a normal operation phase using the primary sensing apparatus 210 located at the primary location. At block 512, the vibratory signature 310 at the primary location during the normal operation phase is converted to a vibratory signature at the secondary location during the normal operation phase using the transfer algorithm 302.

The method 500 may further comprise: determining an abnormality in response to the vibratory signature at the secondary location during the normal operation phase without the secondary sensing apparatus 400. An alarm may be activated in response to the determination of the abnormality. The method may also comprise tracking component degradation level in response to the vibratory signature at the secondary location during the normal operation phase without the secondary sensing apparatus 400. An alarm may be activated in response to the component degradation level. The alarm may be audible, visual, and/or vibratory. An abnormality may be an unusual vibration that may indicate inspection and/or replacement of a component may be required.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of monitoring a conveyance apparatus within a conveyance system, wherein the conveyance system is an elevator system and the conveyance apparatus is an elevator car or wherein the conveyance system is an escalator system and the conveyance apparatus is a moving stair or wherein the conveyance system is a moving walkway and the conveyance apparatus is a moving pallet, the method comprising:
   detecting a vibratory signature at a primary location during a commissioning phase using a primary sensing apparatus located at the primary location;
   detecting a vibratory signature at a secondary location during the commissioning phase using a secondary sensing apparatus located at the secondary location;
   determining a transfer algorithm in response to the vibratory signature at the primary location during the commissioning phase and the vibratory signature at the secondary location during the commissioning phase;
   detecting a vibratory signature at the primary location during a normal operation phase using the primary sensing apparatus located at the primary location; and
   converting the vibratory signature at the primary location during the normal operation phase to a vibratory signature at the secondary location during the normal operation phase using the transfer algorithm;
   wherein the secondary sensing apparatus is removed from the conveyance system prior to the detecting the vibratory signature at the primary location during the normal operation phase using the primary sensing apparatus located at the primary location; and converting the vibratory signature at the primary location during the normal operation phase to a vibratory signature at the secondary location during the normal operation phase using the transfer algorithm.

2. The method of claim 1, wherein prior to the detecting the vibratory signature at the primary location during the commissioning phase using the primary sensing apparatus located at the primary location, the method further comprises:
   moving the conveyance apparatus for the commissioning phase.

3. The method of claim 1, wherein prior to the detecting the vibratory signature at the primary location during the normal operation phase using the primary sensing apparatus located at the primary location, the method further comprises:
   moving the conveyance apparatus for the normal operation phase.

4. The method of claim 1, further comprising:
   determining an abnormality in response to the vibratory signature at the secondary location during the normal operation phase without the presence of the secondary sensor.

5. The method of claim 1, wherein the primary location is located on the conveyance apparatus.

6. The method of claim 1, wherein the secondary location is located on the conveyance apparatus.

7. The method of claim 5, wherein the secondary location is located on the conveyance apparatus.

8. The method of claim 1, further comprising:
   tracking component degradation level in response to the vibratory signature at the secondary location during the normal operation phase without the secondary sensing apparatus.

9. A sensor system for monitoring a conveyance apparatus of a conveyance system, wherein the conveyance system is an elevator system and the conveyance apparatus is an elevator car or wherein the conveyance system is an escalator system and the conveyance apparatus is a moving stair or wherein the conveyance system is a moving walkway and the conveyance apparatus is a moving pallet, the sensor system comprising:
   a primary sensing apparatus located at a primary location, the primary sensing apparatus configured to detect a vibratory signature at the primary location during a commissioning phase and a vibratory signature at the primary location during a normal operation phase;

a secondary sensing apparatus located at a secondary location, the secondary sensing apparatus configured to detect a vibratory signature at the secondary location during the commissioning phase; and a data conversion module configured to perform operations comprising:

receiving the vibratory signature at the primary location during the commissioning phase from the primary sensing apparatus;

receiving the vibratory signature at the secondary location during the commissioning phase from the secondary sensing apparatus;

determining a transfer algorithm in response to the vibratory signature at the primary location during the commissioning phase and the vibratory signature at the secondary location during the commissioning phase;

receiving the vibratory signature at the primary location during the normal operation phase from the primary sensing apparatus; and converting the vibratory signature at the primary location during the normal operation phase to a vibratory signature at the secondary location during the normal operation phase using the transfer algorithm;

wherein the secondary sensing apparatus is removed from the conveyance system prior to the detecting the vibratory signature at the primary location during the normal operation phase using the primary sensing apparatus located at the primary location; and converting the vibratory signature at the primary location during the normal operation phase to a vibratory signature at the secondary location during the normal operation phase using the transfer algorithm.

10. The sensor system of claim 9, wherein the operations further comprise:

determining an abnormality in response to the vibratory signature at the secondary location during the normal operation phase.

11. The sensor system of claim 9, wherein the primary location is located on the conveyance apparatus.

12. The sensor system of claim 9, wherein the secondary location is located on the conveyance apparatus.

13. The sensor system of claim 11, wherein the secondary location is located on the conveyance apparatus.

14. The sensor system of claim 9, wherein operations further comprise:

tracking component degradation level in response to the vibratory signature at the secondary location during the normal operation phase without the secondary sensing apparatus.

15. A computer program product tangibly embodied on a computer readable medium, the computer program product including instructions that, when executed by a processor, cause the processor to perform operations of monitoring a conveyance apparatus within a conveyance system, wherein the conveyance system is an elevator system and the conveyance apparatus is an elevator car or wherein the conveyance system is an escalator system and the conveyance apparatus is a moving stair or wherein the conveyance system is a moving walkway and the conveyance apparatus is a moving pallet, the operations comprising:

detecting a vibratory signature at a primary location during a commissioning phase using a primary sensing apparatus located at the primary location;

detecting a vibratory signature at a secondary location during the commissioning phase using a secondary sensing apparatus located at the secondary location;

determining a transfer algorithm in response to the vibratory signature at the primary location during the commissioning phase and the vibratory signature at the secondary location during the commissioning phase;

detecting a vibratory signature at the primary location during a normal operation phase using the primary sensing apparatus located at the primary location; and converting the vibratory signature at the primary location during the normal operation phase to a vibratory signature at the secondary location during the normal operation phase using the transfer algorithm;

wherein the secondary sensing apparatus is removed from the conveyance system prior to the detecting the vibratory signature at the primary location during a normal operation phase using the primary sensing apparatus located at the primary location; and converting the vibratory signature at the primary location during the normal operation phase to a vibratory signature at the secondary location during the normal operation phase using the transfer algorithm.

16. The computer program product of claim 15, wherein prior to the detecting the vibratory signature at the primary location during the commissioning phase using the primary sensing apparatus located at the primary location, the operations further comprises:

moving the conveyance apparatus for the commissioning phase.

* * * * *